June 26, 1923.
J. G. SWAIN
METHOD FOR THE MANUFACTURE OF WHEELS
Original Filed Aug. 13 1919   2 Sheets-Sheet 2
1,460,147
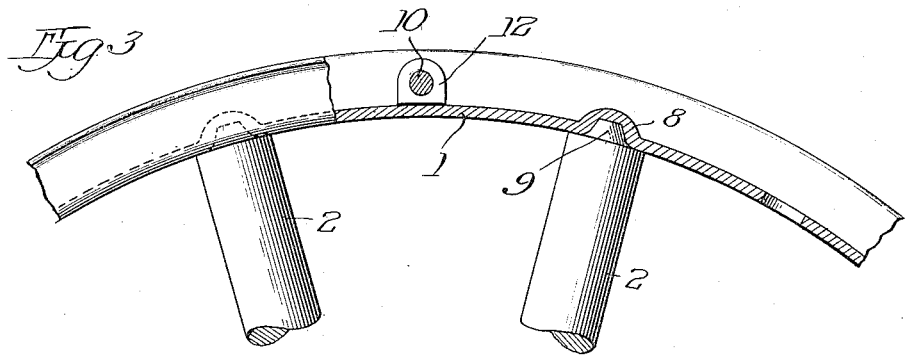
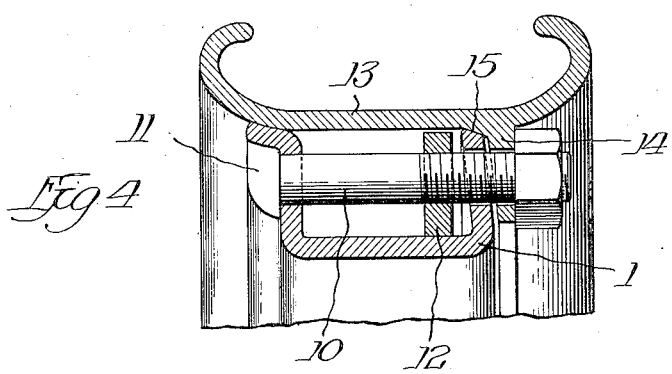
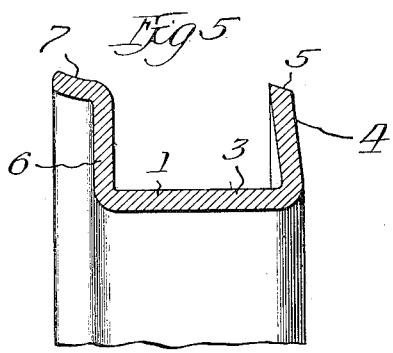 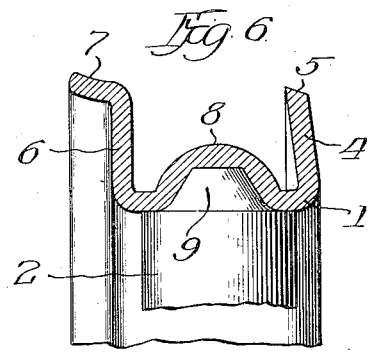
Witness:
Inventor
Joseph G. Swain Patented June 26, 1923.

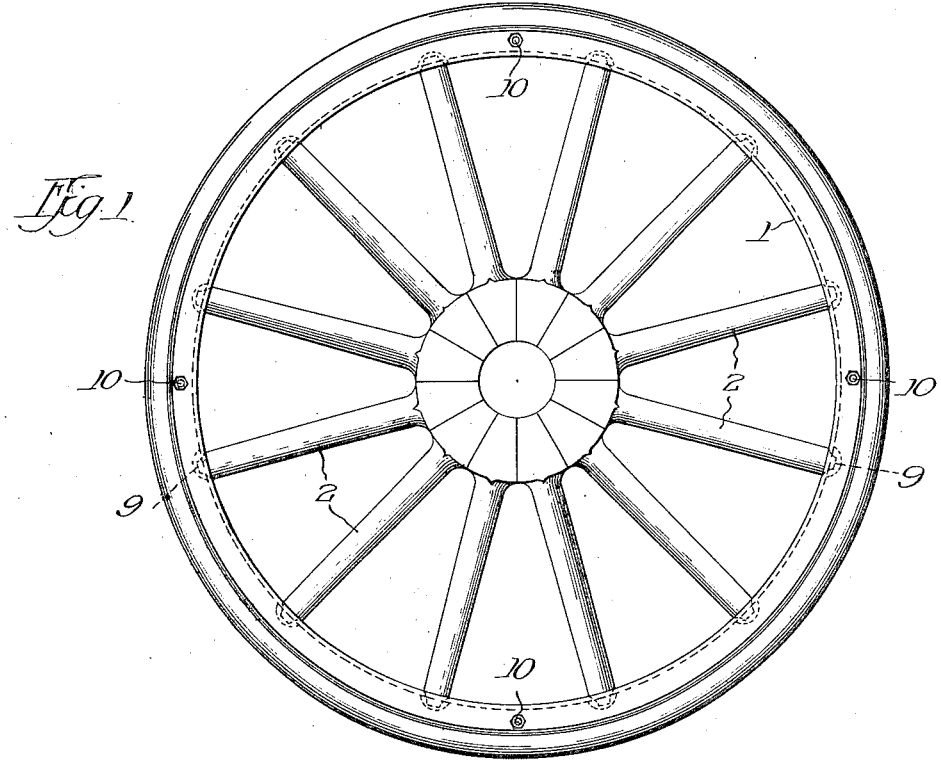
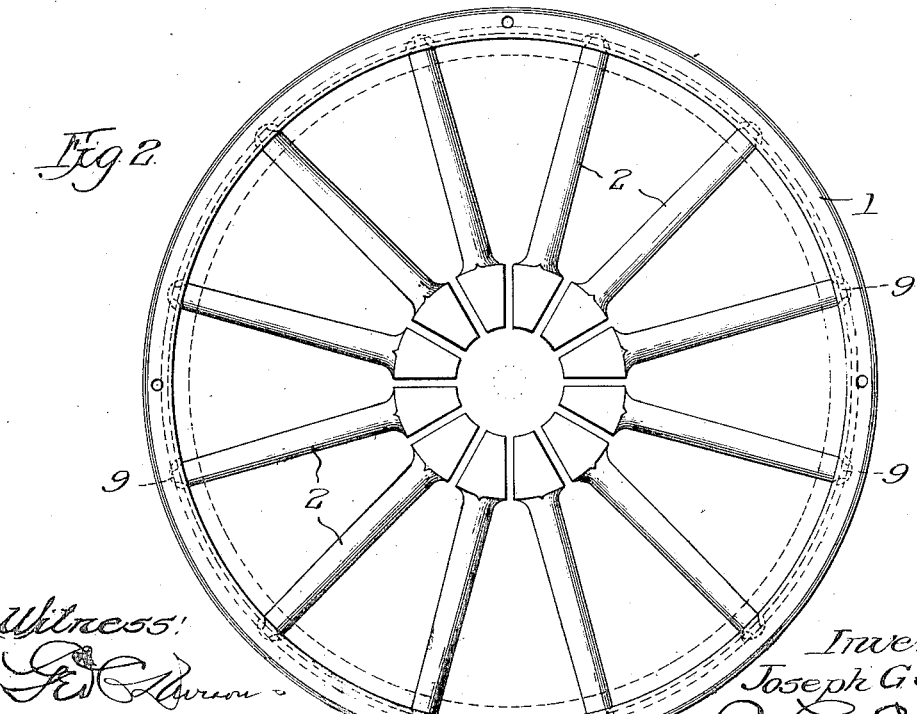

1,460,147

UNITED STATES PATENT OFFICE.

JOSEPH G. SWAIN, OF AKRON, OHIO, ASSIGNOR TO THE FIRESTONE STEEL PRODUCTS COMPANY, OF AKRON, OHIO, A CORPORATION OF OHIO.

METHOD FOR THE MANUFACTURE OF WHEELS.

Original application filed August 13, 1919, Serial No. 317,162. Divided and this application filed February 21, 1921. Serial No. 446,804. Renewed November 25, 1922.

*To all whom it may concern:*

Be it known that I, JOSEPH G. SWAIN, a citizen of the United States, residing at Akron, in the county of Summit and State of Ohio, have invented certain new and useful Improvements in Methods for the Manufacture of Wheels, of which the following is a specification.

The invention relates to an improved form of wheel, the purpose being to construct a light, strong wheel, the manufacture of which may be easily carried out and will result in a superior product. The subject matter of this application is the method of manufacture, the wheel being the subject matter of my prior application, Serial No. 317,162, filed August 13, 1919, of which this application is a division.

In the drawings accompanying this application is shown one method of carrying out the invention, it being understood that changes and modifications may be made without departing from the essential features of this invention, or sacrificing any of its benefits.

In the drawings:

Fig. 1 is a side elevation of a finished wheel.

Fig. 2 is a similar view showing the wheel prior to the finishing operation.

Fig. 3 is a longitudinal section through a portion of the steel felloe.

Fig. 4 is a cross section of the felloe with the rim mounted thereon, taken at one of the securing bolts.

Fig. 5 is a cross section of the felloe.

Fig. 6 is a cross section of the felloe at one of the spoke ends.

The method of manufacturing wheels constituting the subject matter of this invention is primarily intended for the manufacture of a combination of wood and metal wheel, and although the invention is not limited to such use, it is primarily intended for the manufacture of automobile wheels intended to support demountable tire carrying rims.

The wheel comprises a metal felloe 1 and spokes 2, which may be of any material, preferably wood. The felloe is U-shaped or trough shaped and comprises a central base portion 3, an upstanding flange 4 at one side, its outer edge being formed with a bevel seat 5. The opposite flange 6 has an outwardly bent lip or ledge 7 which also forms a seat for the removable or demountable rim.

The felloe is circled in the form shown in Fig. 5, and the ends welded or otherwise joined. In the base portion of the felloe are stamped out, pressed or otherwise formed a plurality of recesses or sockets 8, one for each spoke, and the outer ends of the spokes are formed with projections or knobs 9 designed to seat in the sockets 8.

When the felloe is circled, it is made slightly larger than its finished circumference, and all of the spokes are inserted in the manner shown in Fig. 2. The wheel comprising the felloe and the loose spokes, are then placed in a tire setter or similar machine and the felloe band is squeezed down or contracted to its intended finished circumference. This causes the spokes to be forced tightly together at the hub and the spoke ends to fit closely to the sockets.

By the improved method set forth, there is obtained a light, strong wheel which is easy to manufacture, the inner ends of the spokes are tightly compressed together to form the hub and the spoke ends are securely seated in the sockets in the felloe.

The demountable rim, which may be of any desired form is shown at 13. In the particular form shown, a flange 14 is provided on the underside of the rim, a slight fillet or beveled surface 15 being shown in the angle between the rim and the flange which rests upon the bevel edge 5. The other side of the rim seats upon the lip or edge 7.

A bolt 10 is passed through the flanges 4, 6 and 14 and a nut on the projecting end of the bolt bears against the flange 14 and drives the rim on its seat. To prevent the bolt from turning it may be provided with a head 11, bearing against the ledge 7 and in addition a triangular plate or nut 12 may be screwed in to the central portion of the bolt, the lower side of the plate bearing against the base of the felloe.

By this improved method it is possible to manufacture a light, strong wheel, capable of and adapted for the mounting of a demountable tire carrying rim. The wheel operates in the same manner, as far as holding the demountable rim is concerned, as the wheels in general use. The compression of the rim insures a true circular wheel a result not obtained by previous methods, in which the spokes were expanded into the steel felloe. By pressing the recesses up from the metal of the felloe, a secure seat is provided for the spoke end.

Changes and modifications may be made in the exact proportions or details and the invention is not limited to the exact form shown:

Claims:

1. A method of wheel manufacture comprising the steps of forming a metallic felloe larger than its finished circumference, forming sockets in the base of said felloe, forming spokes with reduced ends to fit said sockets, assembling the spokes and felloe with the reduced ends of the spokes seated in these sockets and compressing the felloe to form a compact wheel structure.

2. A method of wheel manufacture, comprising the steps of forming a metallic felloe larger than its finished circumference, pressing up a plurality of unbroken recesses from the metal in the base of the felloe, forming the spokes with reduced knobs on their ends, assembling the felloe and spokes with the knobs on the spokes in said recesses, and squeezing the felloe down upon the spokes to form a compact wheel structure.

3. A method of wheel manufacture, comprising the steps of forming a metallic felloe, larger than its finished circumference, having parallel upstanding flanges to receive a demountable rim, pressing up from the metal in the base of the felloe between the flanges a plurality of unbroken recesses, forming spokes with reduced projecting ends, assembling the felloe and spokes with the reduced projecting ends seated in the recesses and with their inner ends in parallel relation, then exerting a squeezing action on the felloe to force the ends of the spokes together to form the hub and seat the spoke ends firmly in the recesses.

4. A method of wheel manufacture comprising the steps of forming a metallic felloe larger than its finished circumference, forming recesses in the base of the felloe from the metal thereof, assembling spokes with their outer ends received in the recesses and compressing the felloe to form a compact wheel structure.

5. A method of wheel manufacture, comprising the steps of forming a metallic felloe larger than its finished circumference, forming spokes with reduced projecting ends, forming recesses in the base of the felloe to receive the reduced ends of the spokes but smaller than the cross section of the spoke body, assembling the spokes with their reduced ends in the recesses and with the outer portion of the spoke end against the base of the felloe, and compressing the felloe to form a compact wheel structure.

6. The method of manufacturing a wheel which consists in forming a metallic felloe, forming a plurality of sockets from the metal of the felloe, assembling spokes with their outer ends seated in the sockets and with their inner ends arranged loosely about the hub, and exerting pressure inward from the circumference of the felloe to force the inner ends of the spokes together and their outer ends within the sockets.

7. A method of wheel manufacture, comprising the steps of forming a metallic felloe, having parallel upstanding flanges to receive a demountable rim, pressing up from the metal in the base of the felloe between the flanges a plurality of unbroken recesses, assembling a plurality of spokes with their outer ends seated in said recesses and their inner ends in parallel relation, then exerting a squeezing action about the circumference of the wheel toward the center thereof to force the inner ends of the spokes together to form the hub and to seat the outer ends of the spokes in the recesses.

8. A method of manufacturing a wheel adapted to receive a demountable tire carrying rim, comprising the steps of circling a metal base with inner and outer rim seats thereon, providing in the central plane of the base a plurality of sockets, assembling the metal base and a series of spokes with their outer ends in the sockets and their inner ends around the hub opening, then reducing the circumference of the metal base whereby the outer ends of the spokes are seated in the sockets and the inner ends are compressed together at the hub.

9. A method of manufacturing a wheel adapted to receive a demountable tire carrying rim, comprising the steps of circling a metal base with inner and outer rim seats thereon, providing in the central plane of the base a plurality of sockets, assembling the metal base and a series of spokes with their outer ends in the sockets and their inner ends loosely arranged about the hub opening, then reducing the circumference of the metal base whereby the outer ends of the spokes are firmly seated in the base and the inner ends compressed together at the hub.

JOSEPH G. SWAIN.